July 9, 1963 W. A. SCUDIERI 3,096,876
PORTABLE SWAGING DEVICE
Filed Dec. 23, 1960 2 Sheets-Sheet 1
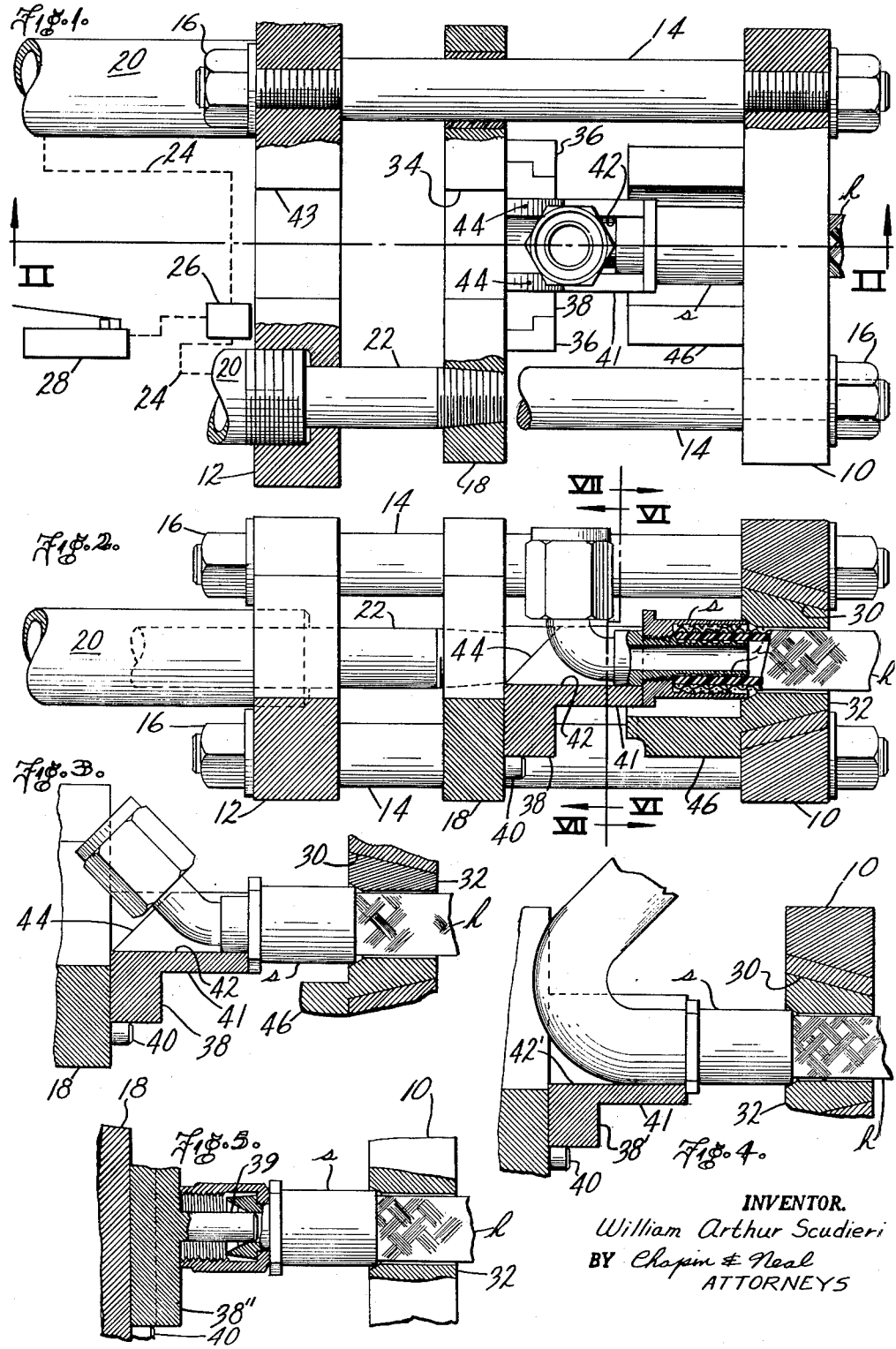
INVENTOR.
William Arthur Scudieri
BY Chapin & Neal
ATTORNEYS INVENTOR.
William Arthur Scudieri
BY Chapin & Neal
ATTORNEYS

United States Patent Office 3,096,876
Patented July 9, 1963

3,096,876
PORTABLE SWAGING DEVICE
William Arthur Scudieri, Hazardville, Conn., assignor, by mesne assignments, to Atlas Corporation, New York, N.Y., a corporation of Delaware
Filed Dec. 23, 1960, Ser. No. 78,071
7 Claims. (Cl. 205—4)

The present invention relates to improvements in portable swaging devices.

The object of the invention is to provide a draw swaging device which is particularly adapted for attaching a wide variety of end fittings to flexible hose and particularly to make such a device portable for field installation of end fittings on aircraft and missiles.

The device of the present invention is intended for use with end fittings comprising an insert portion which is telescoped into the end of a hose and a sleeve or collar which is telescoped over the end of the hose. By draw swaging the collar, the hose is tightly clamped against the insert portion. When end fittings are so attached it is possible to obtain extremely high performance characteristics.

The device of the present invention is characterized by its simplicity and by its ability to be used in attaching a wide variety of end fittings. The latter feature is of importance because the insert portion of such end fittings may be integral with any of a number of functional components, as exemplified by a simple coupling or a length of tubing having a complicated shape. The swaging device herein disclosed, can be used to attach practically all end fittings now in use.

In accordance with another object of the invention, the present device may also be employed to quickly remove end fittings in the field. This is done in a manner which destroys only the collar and preserves the other and more expensive portions of the end fitting for reuse.

The above and other related objects and features of the invention will be apparent from a reading of the following description of the disclosure found in the accompanying drawings and the novelty thereof pointed out in the appended claims.

In the drawings:

FIG. 1 is a plan view, with portions broken away and in section, of a swaging device embodying the present invention and with the hydraulic system therefor diagrammatically shown;

FIG. 2 is a section taken on line II—II in FIG. 1;

FIGS. 3 and 4 are fragmentary sections similar to FIG. 2 showing different types of end fittings being swaged;

FIG. 5 is a fragmentary section, also similar to FIG. 2, showing an alternate element of the swaging device used for "straight through" fittings;

Figure 6:
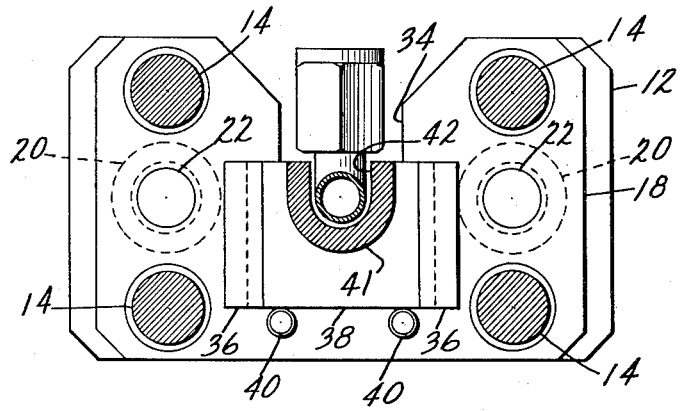
FIG. 6 is a section taken on line VI—VI in FIG. 2.
Figure 7:
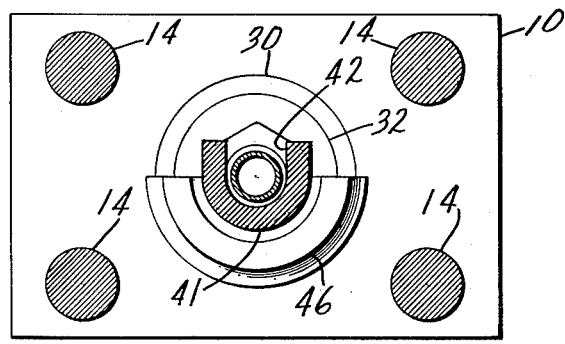
FIG. 7 is a section taken on line VII—VII in FIG. 2.

The device seen in the drawings comprises a base plate 10 which is connected to a frame or top plate 12 by posts 14. Nuts 16 clamp the plates in parallel spaced relation against shoulders on the posts 14. A pressure plate 18 is slidably mounted on the posts 14.

A pair of hydraulic cylinders 20 are mounted on the top plates 12 with their piston rods 22 passing therethrough and respectively connected to opposite ends of the pressure plate 18. Spring means within the cylinders 20 normally urge the piston rods 22 toward the left to space the pressure plate 18 from the base plate 10. Lines 24 connect the cylinders to a header 26 which in turn is connected to a hand operated hydraulic pump 28. The cylinders are of equal capacity so that by pressurizing the pump 28, these motors will exert equal pressure on the pressure plate 18 to force it smoothly toward the base plate 10.

The base plate 10 is provided with a tapered opening for receiving swaging dies, or, as illustrated, an adapter ring 30 which in turn receives a pair of semi-cylindrical swaging dies 32. The adapter ring 30 is, of course, omitted when using larger swaging dies.

The pressure plate 18 is provided with an upwardly open slot 34 which extends substantially beyond the axis of the swaging dies 32. Grooved rails 36 are secured to the pressure plate 18 on opposite sides of the slot 34. A pressure member 38 is held in the grooves of the rails 36 and positioned heightwise by pins 40 projecting from the plate 18. The pressure member 38 has a U-shaped projection 41 defining an upwardly open channel 42. It is the function of the channel 42 to support and position all angled or elongated fittings relative to the swaging dies 32.

It will, of course, be appreciated that for each size and style of fitting, there is a particular pressure member 38 and a particular set of dies 32 which should or must be selected. This is evident from FIGS. 1–4. The same pressure plate 38 and dies 32 are employed in FIG. 3 for a 45° elbow as in FIGS. 1 and 2 for a 90° elbow. In FIG. 3 reference is also made to relief cuts 44 which provide clearance for the nut of the 45° elbow. In FIG. 4 a special purpose end fitting is to be attached to the same size hose and requires a pressure plate 38' having a larger channel 42' while the same dies 32 may be used as before. The fitting seen in FIG. 4 is exemplary of the complicated fittings which may be attached by the present device. It will also be noted there are no lengthwise limitations on the fittings which may be secured. This latter feature is made possible by the channel 42 in the pressure member 38, the slot 34 in the pressure plate 18 and a further aligned slot 43 in the top plate 12.

FIG. 5 illustrates another alternate pressure member 38" which may be used with the dies 32 for attaching "straight through" fittings as the illustrated female portion of a coupling. The pressure member 38" comprises a pilot 39 which centers the sleeve of the fitting relative to the dies 32. Pressure is applied to the coupling by the area of the pressure plate 38" at the base of the pilot 39.

With any of the described setups the pump 28 (FIG. 1) is operated to force the pressure plate 18 towards the base plate 10. As this is done the sleeve s of the fitting is forced into the dies 32 and reduced in size to clamp the hose h against the insert portion i of the fitting (FIG. 2). The sleeve s is connected by screw threads to the base of the insert portion i. In the case of the illustrated elbows (FIGS. 1–4) there is a shoulder through which the swaging force is transmitted. In the case of the coupling (FIG. 5) the swaging force is transmitting through the connecting nut and a similar shoulder. In either case, it is desirable to provide means for limiting movement of the pressure plate 18 towards the base plate 10 so as to prevent these force transmitting portions of the fitting from being crushed. This end is provided for by the solid abutment 46 which is preferably formed on one of the dies 32. The length of the abutment 46 and the length of the projection 41 (where used) are factors which must be predetermined for each fitting in the preferred embodiment of the invention to limit movement of the pressure plate towards the base plate to prevent crushing of a given fitting.

Figure 8:
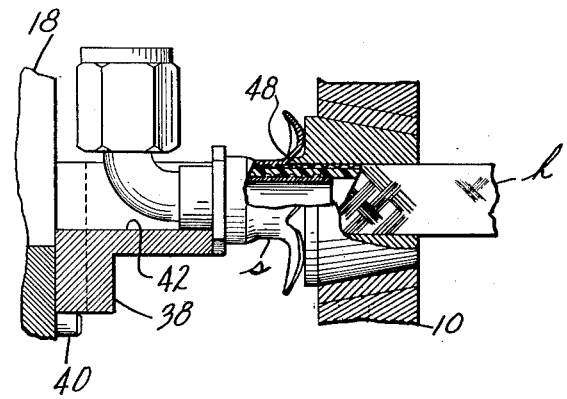
FIG. 8 is a section similar to FIG. 2 showing the device being used to remove an end fitting.

FIG. 8 illustrates the use of the present device to remove end fittings. The dies 32 are replaced by tapered cracking collars 48. The pressure plate 36 bears against the fitting as before and forces the end of the sleeve s against the collars 48. The action of the collars is to peel back the sleeve for removal of the hose from the fitting as is more fully described in my copending application Serial No. 63,901, filed October 20, 1960. After the hose has been detached, the sleeve s can be removed and by providing a new sleeve the fitting may be reused.

For present purposes the tapered collars 48 may be broadly considered as die means having an entrance facing the pressure plate 18.

Having thus described the invention what is claimed as novel and desired to be secured by Letters Patent of the United States is:

1. A swaging device comprising a base plate, a frame plate, a plurality of posts mounting said plates in parallel, spaced relation, a pressure plate slidably mounted on said posts between said frame and base plates, die means mounted in said base plate with the entrance thereto facing said pressure plate, means including a pressure member on said pressure plate for aligning a fitting with said die means, said frame plate and said pressure plate having aligned slots opening on one side of said plates and extending beyond the axis of said die means to provide clearance for certain fittings, and means for forcing said pressure plate towards said base plate.

2. A swaging device as in claim 1 wherein means are provided for limiting the movement of the pressure plate towards said base plate to a position in which the pressure member is spaced from the die means thereby preventing the fitting from being crushed by said pressure member.

3. A swaging device as in claim 1 wherein the pressure member comprises a channel aligned with said slots, the sides and bottom of said channel being adapted to align an elbow or like fitting with said die opening.

4. A swaging device as in claim 1 wherein the die means comprise a pair of semi-cylindrical elements compositely having a frusto-conical form tapered away from the die opening and the base plate has a tapered hole forming a seat for removably receiving said elements.

5. A swaging device as in claim 1 wherein the pressure member is removably mounted on said pressure plate.

6. A swaging device as in claim 5 wherein the pressure member is removably mounted on the face of the pressure plate opposed to said base plate and comprises a channel aligned with said slots, the sides and bottom of said channel being adapted to align an elbow or like fitting with said die opening.

7. A swaging device as in claim 1 wherein the means for moving the pressure plate comprises a pair of hydraulic cylinders of equal capacity, each cylinder having a piston rod projecting therefrom, said cylinders being mounted on said frame plate on opposite sides of the slot therein with the piston rods projecting therethrough and secured to said pressure plate, said cylinders being equidistant from the axis of said die means and on a line intersecting said axis, and means connecting said cylinders to a common source of hydraulic pressure.

References Cited in the file of this patent

UNITED STATES PATENTS

| 1,562,230 | Guttly | Nov. 17, 1925 |
| 1,782,219 | Wallace | Nov. 18, 1930 |
| 2,527,458 | Schurr | Oct. 24, 1950 |

FOREIGN PATENTS

| 14,993 | Great Britain | Nov. 18, 1886 |